Fig. 1.

Inventor
William F. Rust
By Ralph L Chappell
Attorney

Oct. 24, 1950 W. F. RUST 2,526,693
APPARATUS FOR TRAINING AIRCRAFT PILOTS
Filed Dec. 18, 1944 5 Sheets-Sheet 3

Inventor
William F. Rust
By Ralph L. Chappell
Attorney

Oct. 24, 1950     W. F. RUST     2,526,693
APPARATUS FOR TRAINING AIRCRAFT PILOTS
Filed Dec. 18, 1944     5 Sheets-Sheet 4

Inventor
William F. Rust
By Ralph L. Chappell
Attorney

Oct. 24, 1950 W. F. RUST 2,526,693
APPARATUS FOR TRAINING AIRCRAFT PILOTS
Filed Dec. 18, 1944 5 Sheets-Sheet 5

Students Control Unit.

Fig.8.

Wind Drift Unit.

Fig.9.

Aircraft Course Recorder.

Fig.10.

Submarine Course Recorder.

Fig.11.

Inventor
William F. Rust
By Ralph L. Chappell
Attorney

Patented Oct. 24, 1950

2,526,693

UNITED STATES PATENT OFFICE 2,526,693

APPARATUS FOR TRAINING AIRCRAFT PILOTS

William F. Rust, United States Navy

Application December 18, 1944, Serial No. 568,741

8 Claims. (Cl. 35—10.2)

(Granted under the act of March 3, 1883, as amended April 30, 1928; 370 O. G. 757)

The present invention relates to training devices and more particularly to a device for training aircraft crews in anti-submarine search tactics and in the use of anti-submarine detecting gear.

The particular apparatus described and illustrated in this specification has been specifically designed for the purpose of training in the above procedures and the invention will therefore be described with particular reference to such training. However, certain features of the invention are of broader scope and relate to any type of electromagnetic arrangement wherein a synchronous motor operates over a large range of speeds. Another feature of the invention, utilized in the training device but applicable to various other uses, is an electrical amplifier circuit wherein an increasing or decreasing input signal will be indicated by specific characteristics of the output current.

Preliminary to the following detailed description of the invention, attention is called to some facts that may be kept in mind as the description proceeds, in order that the utility of the invention be thoroughly understood.

It should be borne in mind that present military aircraft, particularly lighter-than-air anti-submarine patrol craft, are provided with detecting devices so designed that they can detect the presence of a submarine in the vicinity of the aircraft even though the submarine be completely submerged and entirely invisible. This equipment is of inestimable value in modern warfare, since by its use lighter-than-air craft attack the submarine without assistance. In fact, in many cases it is considered better tactics for the crew of the aircraft not to attempt an unassisted attack but to continue to patrol the area and maintain instrument contact with the target until bombing planes or surface vessels can be summoned by radio. Such tactics not only prevent the possibility of destruction of the relatively slow moving and vulnerable lighter-than-air craft in the event that the submarine should surface and open fire with deck guns, but also reduce the possibility of escape of the submarine.

The design of the anti-submarine equipment includes inherent limitations which make its successful operation largely dependent on the degree of training and skill of the aircraft crew; that is, the equipment in skilled hands is extremely useful, but it is of little value when its use is attempted by those not thoroughly trained in its use. This situation arises from a combination of several causes, one being that the range of the detection equipment is comparatively short, so that even when a signal is picked up the normal flying speed of the aircraft will carry the craft beyond the range of the equipment before the craft can be halted or its course altered. Thus the crew is faced with the problem of circling or maneuvering the aircraft to attain proximity to the submarine to pick up again the signal. In addition, if an immediate attack is not decided upon, it must repeatedly maneuver about the vicinity and maintain substantially constant instrument contact with the target until other attacking forces can be summoned.

Another inherent limitation of this type of submarine-detection gear arises from the fact that it determines the proximity to the submarine by magnetic means, with the result that magnetic deposits in the earth or other causes may give a false signal similar to the true signal generated when a submarine is located. Thus, while the presence of a target is indicated by the fluctuation of a needle on an electrical instrument, the needle of the instrument may also fluctuate in response to false signals and the difference in characteristics between the false and true signals is discernible only to an operator thoroughly versed in the peculiarities of the apparatus.

The result of this situation is that the effective use of the equipment requires an extremely high level of skill and experience on the part of the aircraft crew in order first to detect the characteristics of the needle fluctuation with sufficient skill to recognize the characteristics indicating a contact with an actual target and to distinguish these from the various other fluctuations caused by natural phenomena, and second, to maneuver the aircraft so that, even though the signal is temporarily lost, the aircraft will again intercept the course of the submarine and maintain contact.

Equipment of this character presents a rather unusual and extremely difficult training problem. In the first place, an aircraft will be seriously hampered in its operations if it attempts to carry persons to observe the operation of the submarine detecting equipment in order to become trained in the use of such equipment. Furthermore, and possibly more important, aircraft may make many long patrol flights without at any time encountering instrument signal indicating the presence of a submarine, and under any normal conditions the true signals will be comparatively few, so that little experience can be gained in actual operations. Further, even in the event that a signal is picked up, the necessity of concentrating all attention on maintaining instrument contact with the submarine, and in attacking or directing other aircraft to attack leaves little time for the operator of the equipment to instruct others, or to point out the exact characteristics by which the true signal generated by the presence of the submarine may be distinguished from various false signals, The result of this situation is that it is a practical impossibility to train operators by using the service detecting gear unless a friendly submarine is used to maneuver in designated waters and students under instruction are actually flown over the area, so that the aircraft can circle the target and repeatedly pick up the genuine signals generated thereby until the students become familiar with the use of the apparatus. Such a training program is, of course, extremely costly; for the combined cost of operation of a submarine and an aircraft is great, and the student capacity within the aircraft is extremely small. Further, in a state of war, all aircraft and submarines are urgently needed for actual operational duties and can hardly be spared for training purposes.

There is an urgent need for equipment so devised that students may be trained in the use of anti-submarine detecting gear without requiring the actual operation of an aircraft and submarine. This result is accomplished by the present invention.

In brief, the primary object of the present invention is to provide a training device including means for simulating the operation of service submarine-detection gear, including means for generating a signal having similar characteristics to signals generated by the service gear when a submarine is encountered and means to duplicate the problems of steering and navigation that arise in connection with the use of such equipment.

A further object resides in the provision of such a training device including all of the foregoing features, and, in addition, having means for generating arbitrary signals with characteristics other than those generated by proximity to an actual target so that the student may learn to distinguish between true and false signals.

Another object is the provision of a training device as above indicated, together with an instructor's station located to permit simultaneous observation of the course recorders for both the aircraft and the submarine, and a student operator's station arranged to permit observation of the movement of the aircraft course recorder only.

A related object resides in the provision of an electrical amplifying system including an output circuit; together with means whereby a signal of increasing intensity in the input circuit will cause direct current flow in one direction in the output circuit, whil an input signal of decreasing intensity will cause a direct current flow in the opposite direction in the output circuit.

Another important related object resides in the provision of means for generating an alternating current of variable frequency in order to drive synchronous motors throughout an uninterrupted range of speeds; and particularly in the provision of means to increase the voltage of the generator in response to increases of the frequency, in order that the motors may be operated through a far greater range of speeds than heretofore possible.

In connection with the variable frequency drive for the course recorder motors, it is recognized that certain attempts have been made to drive synchronous motors at variable speeds by means of a variable frequency generator. One such arrangement is disclosed in United States Patent 2,332,475. The disclosure of that patent falls far short of accomplishing the result obtained in the arrangement here discussed, however, since the range of frequency to which the synchronous motors of the patent will respond is quite limited, while the present invention makes possible satisfactory operation of the motors throughout a range in which the maximum speed may be as great as five times the minimum speed.

To accomplish the foregoing objects, the invention contemplates the provision of a student's station, which may be a seat simulating the seat in a lighter-than-air aircraft, together with a wheel or other control to influence the rate of turn of a course recorder, and a throttle control by which the recorder speed may be varied. The student's station also includes a meter simulating an air-speed indicator and a second meter simulating the indicating dial of operational anti-submarine search gear.

The student, by manipulating the wheel and throttle, can simulate various maneuvers that can be performed in an actual aircraft, and the course of such an aircraft will be indicated by a course recorder of a type well known in the art, which recorder will travel about a field area in the exact accordance with the turns made and speed indicated by the simulated aircraft instrument. Thus, in developing search tactics, the pilot can fly around the target in any given pattern and learn to follow patterns found to be the most effective for the purpose. The pilot seat is so arranged that he can visually follow the position and heading of his craft by observing the position and heading of its course recorder. To this end, the course recorder is operated on a plane surface immediately below a translucent glass sheet, so that a miniature projector, mounted on the course recorder, may project the image of the aircraft on the glass sheet where it can be observed by the student as he operates the controls, giving him a constant indication of his position and heading. The equipment is so designed that the student can not exceed allowable turn rates for the type of aircraft being simulated.

To simulate fully an anti-submarine search, it is, of course, necessary to provide some simulation of the target; that is, the enemy submarine. This is accomplished in the present invention by a second course recorder, operating on a surface immediately below the plane surface of the first recorder. Although the two recorders act on different surfaces, they are each free to maneuver over the same area which, in this case, represents an area of open sea.

A realistic proximation of the conditions of the anti-submarine search is accomplished by providing means for automatically generating a signal visible on the instruments at the student's station whenever the two recorders approach the same point on the field. This result is accomplished by the combination of a miniature signal generator on one recorder and detecting means on the other recorder so that whenever the recorder of the aircraft moves directly over the recorder representing the submarine an electromagnetic signal transmitted between the recorders will cause a fluctuation of the needle of one of the instruments in the student's station. Thus, whenever the student succeeds in manipulating controls to bring the recorder of the aircraft into a position immediately above the position of the submarine course recorder, the fact is indicated by a fluctuation of the instrument before the student. This fluctuation takes place as the course recorder for the aircraft crosses directly over the submarine course recorder, so that that student is faced with the problem of circling or otherwise maneuvering to bring the aircraft back over a path that will again intersect and cross over the exact location of the target. Such a maneuver is obviously simple, of course, if the target remains stationary, but in maneuvers the target may be moving at any speed proportionate to the speed of a submarine. This condition is also simulated in the present invention by having the aircraft recorder and the movable submarine course recorder have speeds in the same proportion as the speeds of a real lighter-than-air craft and a submerged submarine. However, notwithstanding the fact that the speed of the aircraft is considerably greater than that of the submarine, it is entirely possible for the student to maneuver the aircraft so as to pick up again the signals from the submarine and maintain instrument contact. This problem is, of course, the same problem that confronts a pilot on actual anti-submarine flight maneuvers and the problem is solved the same way in the trainer that it is solved in actual flight; that is, by the practice and development of search tactics or flight patterns so designed that by repeated maneuvers the path of the aircraft and of the submarine are likely to intersect within a reasonable time interval. These patterns of flight are of several different types and in some instances are complex, but for the purposes of this application it is unnecessary to describe these patterns in detail, since it is obvious that any type of pattern which can be flown in an aircraft can be duplicated exactly in the trainer. Further, since the relative speeds of the submarine-course recorder and the aircraft-course recorder are in exact accordance with the possible speeds of an actual submarine and operational aircraft, the results achieved by the manipulation of the controls in an effort to follow any given pattern can be checked and the efficiency of the pattern and of the students attempting to fly the pattern can be well estimated.

In actual flight, the pilot can drop a float light or a dye slick onto the surface of the sea, and can then use this mark as a reference point in executing his flight pattern. The same effect is achieved in the present training equipment by marking the glass sheet with a china marking crayon to furnish a visual reference point.

The direction and speed of the submarine-course recorder is under the control of the instructor. The instructor can also make adjustments in control of the aircraft recorder control circuits to give the effect of wind drift caused by changes in direction or velocity of the wind, so that the student must compensate for these variables in order to fly an accurate search pattern. Manual controls are also provided whereby the instructor can cause arbitrary fluctuations in the instruments viewed by the student. When the instructor gives arbitrary signals the student learns to detect these and to distinguish them from the true signals given when a target is approached.

In the form of the invention illustrated in the drawings and chosen as best illustrative of the inventive principles, the course recorders and their control equipment are housed within a rectangular cabinet 10 having a translucent glass plate 11 forming its upper surface. Immediately below the plate 11 is an open compartment 12 and a second open compartment 13 is below the compartment 12. These open compartments include a flat glass plate 14 and a smooth surface 15 on which the course recorders move. A drawer 16 is below the compartment 13. The drawer 16 contains a central control unit 17, wind drift controls 18, an auxiliary power supply 19, and a wind drift unit (not shown).

The open compartments 12 and 13 are each provided with a course recording mechanism similar in principle to the recording device illustrated in United States Patent No. 2,179,663. Inasmuch as the mechanical details of these course recorders do not form a part of the present invention except in connection with other features herein described and claimed, the operating mechanism of the recorders will not be discussed in this application. Suffice to say that each of these recorders may move in any direction and that they are operable throughout a wide range of operating speeds, the operating speeds being proportionate to the relative speeds of a lighter-than-air aircraft and of a submarine, respectively; that is, the recorder 21 (Fig. 2) may be driven at any speed proportionate to the operating speed of an aircraft, while the recorder 22 is geared down to move at a much slower speed, the ratio of the two speeds representing the speed relationship existing between an aircraft and a submerged submarine.

Operating connections between the different units of the device are established by means of a plurality of flexible electric cables extending between the different individual units and interconnecting all the related circuits to produce a unitary result. More specifically, the electrical connections between the student's station and the remainder of the apparatus are established through a flexible cable A (Fig. 1) which extends to the wind drift unit. Connections from the wind drift unit to the central control cabinet are effected through a cable B which, while not illustrated in the assembly views of the drawing, is diagrammatically shown in Figs. 6 and 9. Similarly, a cable C which extends from the central control unit to a 115 volt 60 cycle power supply line is shown only in Fig. 6. The aircraft course recorder unit 21, as shown in Fig. 2, is electrically connected with the control unit 17 (Fig. 1) through a flexible cable D; the submarine course recorder 22 is connected to the control unit 17 through a cable E, and connections between the auxiliary power supply unit and the central control unit are established through the cable F.

Figure 1:
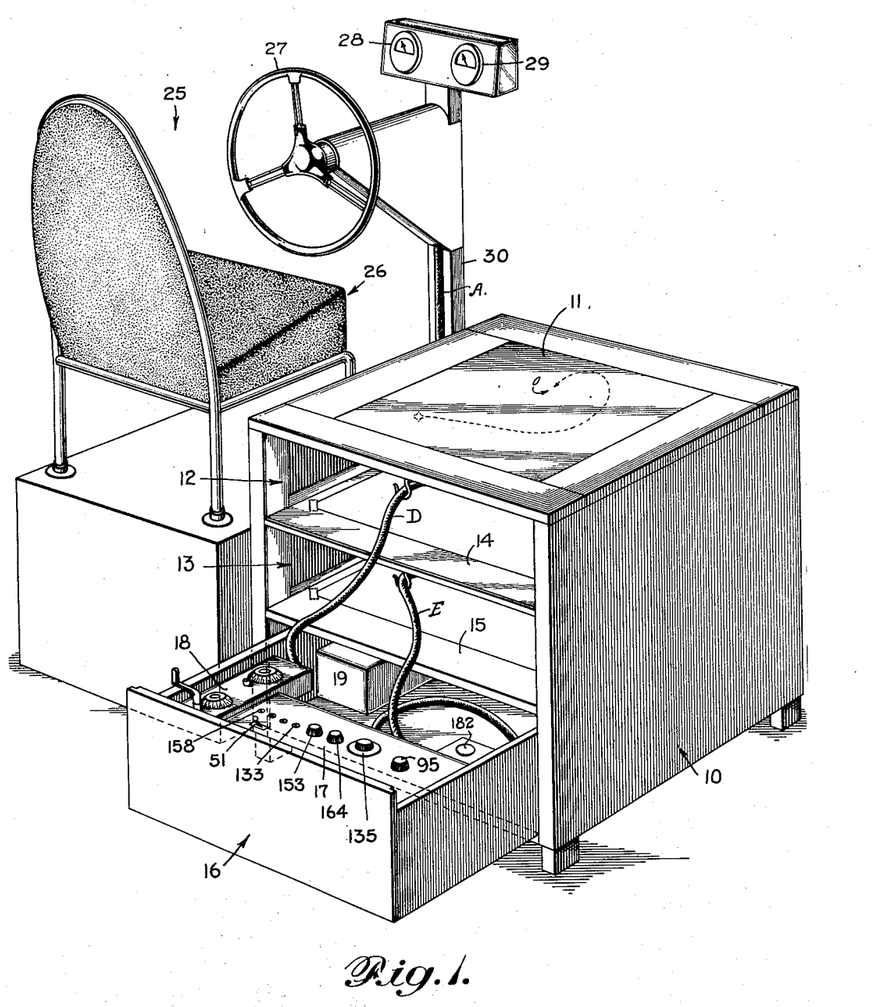
Fig. 1 is a perspective view of the present preferred embodiment of the invention.

When the drawer 16 is opened the various control dials and knobs of the main control unit 17 and wind drift controls 18 are exposed so that they can be easily and conveniently manipulated by an instructor seated in front of the cabinet.

The student's station 25 is provided with a seat 26 so positioned that the upper surface of the translucent plate 11 is visible to the student as he operates the controls of the device. The student's station is provided with a steering wheel 27 which controls the rate of turn of the recorder 21. If desired, the student station may also be provided with a throttle control lever (not shown), which is mechanically connected into the wind drift unit 18 to effect variations in the speed of the recorder. The student's station is also provided with a meter 28 simulating the air-speed indicator of the aircraft and a second meter 29 which simulated the indicating dial of operational anti-submarine detecting apparatus. All of the devices 27, 28 and 29 are shown for convenience as being mounted on a support 30.

Figure 2:
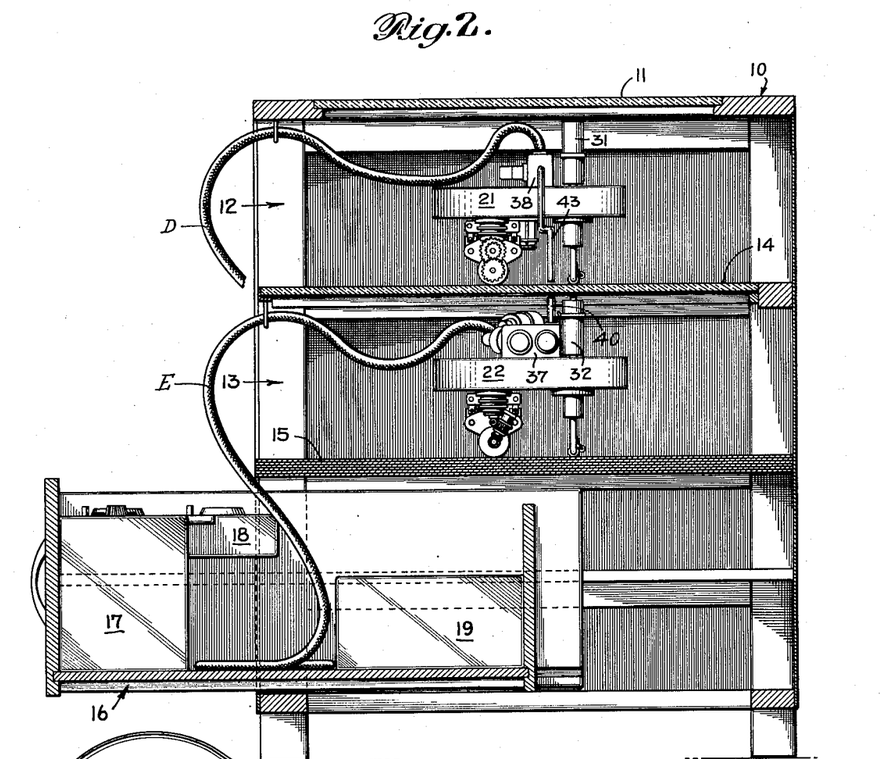
Fig. 2 is a central cross-sectional view taken through the course recorder cabinet of the device.
Figure 3:
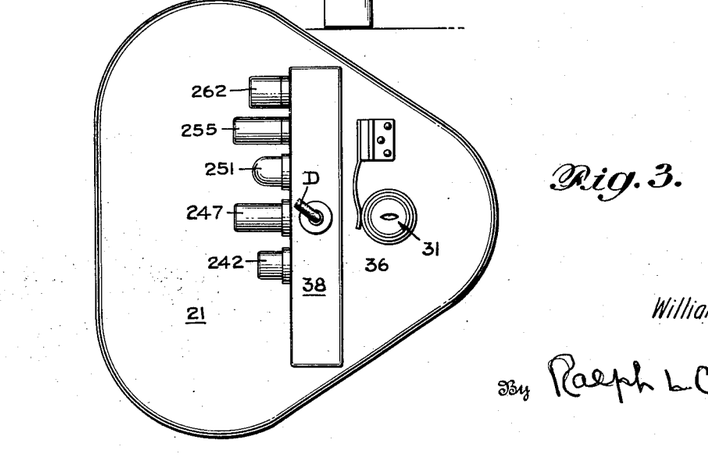
Fig. 3 is a top plan view of an aircraft course recorder.
Figures 4, 5:
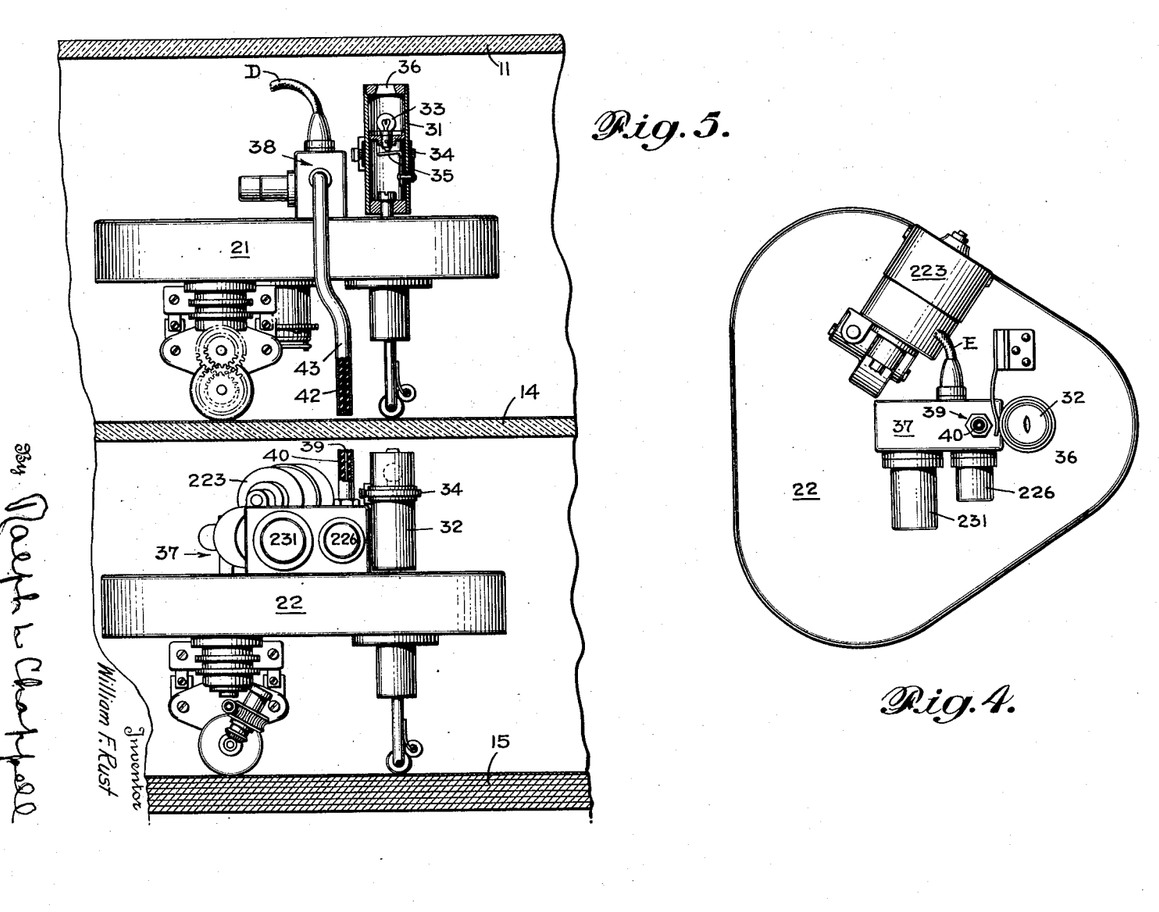
Fig. 4 is a top plan view of the submarine course recorder.
Fig. 5 is a detail fragmental sectional view of a portion of the course recorder cabinet showing the two course recorders in superposed relationship, the view showing certain parts of the recorders broken away to show the internal structure thereof.

The course recorder 21, as shown in Figs. 2 and 5, carries a miniature optical projector 31 on the upper extremity of the tracing wheel support, and the recorder 22 has a similar projector 32. Each of these projectors is provided with an electrical flashlight bulb 33 energized through a slip ring 34 and contact 35 and projects a miniature image of the aircraft formed by a correctly shaped aperture 36 onto the translucent plate above the projector so that the student, by observing the surface of plate 11, can at all times be informed of the position and course of the recorder 21, while the instructor seated before the open compartments 12 and 13 may easily determine the relative positions of the upper and lower recorders. It is to be noted, however, that the student has no means of determining the position or course of the submarine course recorder 22 except by means of instruments in a manner to be hereinafter described.

A permanent record of the course of each recorder may be made by covering the plates 14 and 15 with a sheet of paper and inking the tracing wheels of the recorders, in the manner well known in the art.

The detection of the position of the submarine by instruments is effected by mounting a small signal generator 37 on the submarine recorder 22 to transmit a signal that can be picked up and detected by a signal receiver 38 on the recorder 21. In the present instance, the signal generator 37 consists of a miniature long-wave transmitter, including a miniature antenna 39. The antenna 39 is in a vertical position and terminates just below the lower surface of the glass plate 14 that forms the bottom of the upper open compartment 12. The antenna 39 is provided with an insulated shield 40 to limit the effective range of the signal. The receiver unit 38 on the aircraft course recorder 21 comprises a long-wave radio receiver having a vertical antenna 42 terminating just above the glass plate 14 and provided with the grounded shield 43.

The electrical circuit of the apparatus may be divided into a central control unit, an auxiliary power supply, a submarine course recorder circuit, an aircraft course recorder circuit, a wind-drift circuit, and a student's control circuit.

The central control unit includes a pair of variable-frequency alternating-current generating circuits, one of which is arranged to drive the synchronous motors controlling the aircraft course recorder, and the other of which is arranged to drive the synchronous motors controlling the submarine course recorder; together with a main power supply circuit and a meter-actuating circuit to receive signals transmitted between the submarine course recorder and the aircraft course recorder, and to actuate the student's instruments in response to these signals. For convenience in description, each of these circuits will be described separately, and the inter-relation of the circuits will be pointed out in the discussion of their operation.

*The main power supply circuit*

Figure 6:
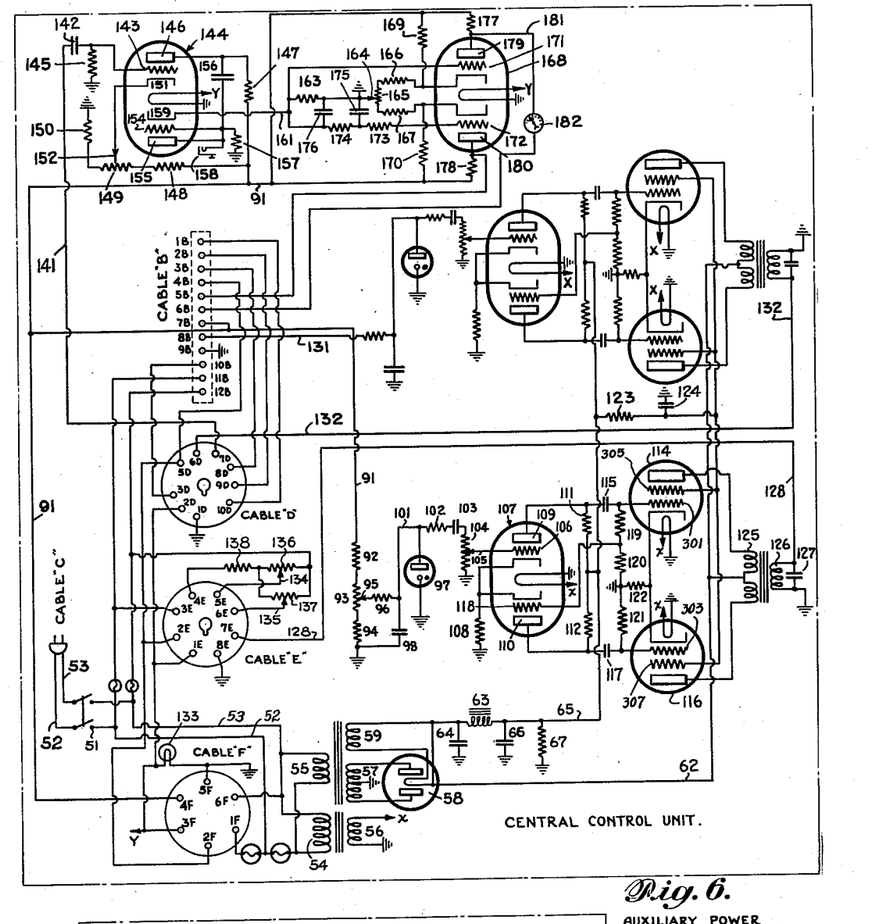
Fig. 6 is a schematic wiring diagram of the central control unit of the device.

All circuits of the entire device are energized by line source of 115 volts 60 cycles which is introduced into the central unit circuit through the cable C. The current is fed through a double-pole, single-throw switch 51 to a pair of conductors 52 and 53. Conductor 52 extends through suitable fuses to conductor 11B of cable B and to conductor 1F in cable F, in order to energize the wind drift unit and the auxiliary power supply unit as will hereinafter be described. Similarly, conductor 53 extends through a fuse to the conductor 12B of cable B and directly to conductor 6F in cable F for the same purpose. Within the central control unit, however, conductors 53 and 52 lead to the primary windings of a pair of power transformers; namely, the primary winding 54 of the filament power transformer and the primary winding 55 of the plate power transformer. The filament power transformer is of the type T-19F93 (Thordarson) and provides an output of 6.3 volts @ 6 amperes through the secondary winding 56. One end of this winding is grounded and the live end of the winding extends through lead X to the various tube heaters of the two variable frequency generating circuits. The plate power supply transformer is of type T-75R50 (Thordarson) having an 870 volt, 250 milliampere secondary winding 57. The center tap of this winding is grounded and the end leads of the winding are connected to the anodes of a rectifier tube 58. The tube 58 is of the 5U4G type and is supplied with filament current by 5 volt, 3 ampere filament winding 59 on the plate transformer.

As previously stated, the center tap of the winding 57 is grounded, so that a positive output potential is available at the filament of the rectifier tube 58. Best results are obtained by supplying plate current to the power amplifiers through a plate lead 62 extending directly from the filament of the tube 58 to the center tap of the output transformers. A second plate circuit lead from the filament of the tube 58 extends through a filter circuit including a type T-17COOB (Thordarson) choke coil 63 (rated at 12 h. @ 150 ma.) to the plate circuit lead 65 extending to the plates of the first amplifier tubes. The filter circuit is completed by a pair of 8 mfd., 600 volt condensers 64 and 66 bridged between each end of the choke coil 63 and the ground. A 20,000 ohm, 10 watt bleeder resistor 67 is also bridged between the plate lead 65 and ground, to reduce voltage surges on the filter condensers and improve the voltage regulation.

*The auxiliary power supply circuit*

Figure 7:
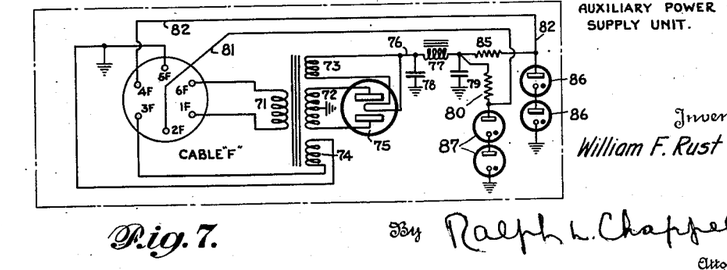
Fig. 7 is a schematic wiring diagram of the auxiliary power supply unit.

The auxiliary power supply unit within the housing 19 includes a power transformer having a primary winding 71 energized directly from the 115 volt, 60 cycle source transmitted through the conductors 1F and 6F in cable F heretofore described. The power transformer is of type T-13R14 (Thordarson) and includes a 700 volt @ 120 ma. secondary winding 72. The center tap is grounded. The low voltage secondary windings 73 and 74 are rated 5 volts @ 4 amps., and 6.3 volts @ 4.7 amps. The winding 73 is directly connected to the filament of tube 75, and the winding 74 is connected directly to the conductors 3F and 5F of cable F, and thence to the tube heater lead Y.

The end taps of the high voltage secondary winding 72 of the transformer are each connected directly to one of the anodes of the rectifier tube 75, which is of the 5U4G type. A positive potential is carried through the wire 76 to energize a filter circuit including a choke coil 77 of type T-17COOB (Thordarson) rated 12 H. @ 150 ma. The filter circuit also includes a 15 mfd., 450 volt condenser 78 bridged between the conductor 76 and ground and a second 15 mfd., 450 volt condenser 79 bridged between ground and the opposite lead of the choke coil 77.

The voltage across condenser 79 is subject to some fluctuation with changes in line voltage and since certain of the functions of the invention require a regulated voltage, a regulated voltage supply is provided. One regulated voltage lead 82 is energized through a 1500 ohm, 10 watt resistor 85 between the filter output and the lead 82. The voltage regulation is accomplished by a pair of type VR150-30 glow tubes 86 connected in series between the lead 82 and ground. Since the tubes 86 fire at 150 volts potential, the series arrangement regulate the voltage of the lead 82 to exactly 300 volts. The regulated voltage lead 82 is connected directly to the conductor 4F in the cable F. In an identical manner 300 volts of regulated potential is supplied to conductor 2F in cable F through lead 81 by a second regulating circuit consisting of resistor 80 and two glow tubes 87.

*The variable frequency generating circuits*

As shown in Fig. 6, the regulated voltage supply from the conductor 4F is introduced into the target A. C. generating circuit for the submarine recorder 22 through an input lead 91. The lead 91 also extends to the signal circuit and aircraft recorder A. C. generating circuit. The regulated voltage input lead 91 extends through a 10,000 ohm resistor 92, thence through a 50,000 ohm linear wire-wound potentiometer 93, and thence through a second 10,000 ohm resistor 94, to ground. Resistors 92 and 94 are selected to provide the desired voltage at each end of potentiometer 93. The contact arm 95 of the potentiometer 93 is connected through a 2 meg., ½ watt resistance 96 to the anode of a glow tube 97. An .02 mfd., 400 volt condenser 98 is bridged between the anode of the tube 97 and ground. The tube 97 is of the VR75-30 type and has its cathode grounded. An input lead 101 from the anode of the glow tube 97 extends through a 300,000 ohm, ½ watt resistor 102 to a .06 mfd., 400 volt condenser 103 and thence to one end of a 500,000 ohm potentiometer 104. The opposite end of the potentiometer is grounded. The center contacting arm 105 which in this instance is pre-set in fixed position, is connected directly to the grid 106 of the first amplifier tube 107. The tube 107 is of the 6SN7GT type. Its filament is energized directly from the filament lead X of the main power supply unit and its twin cathodes are connected together and grounded through a 600 ohm, ½ watt self-biasing resistor 108. Operating potential is applied to the anodes 109 and 110 of the tube by connecting the anodes to the 350 volt main power supply lead 65 through a pair of 50,000 ohm, 1 watt resistors 111 and 112. The anode 109 of the tube is connected to the control grid 301 of the power amplifier tube 114 through a .25 mfd., 400 volt grid condenser 115 and the anode 110 is connected to the control grid 303 of the power amplifier tube 116 through a .25 mfd., 400 volt grid condenser 117. A portion of the A. C. voltage applied to the control grid 301 of the tube 114 is applied to grid 118 through a voltage divider consisting of a 100,000 ohm, ½ volt resistor 119, and a 7,000 ohm ½ watt resistor 120.

The control grids 301, 303 of the power amplifier tubes 114 and 116 are connected by a series of resistances including the resistors 119, 120 and a 1,000,000 ohm, ½ volt resistance 121. The circuit is grounded between the resistors 120 and 121 and the cathodes of both the tubes 114 and 116 are grounded through a 175 ohm, 10 watt resistor 122. The screen grids 305, 307 of the tubes 114 and 116, respectively, are connected together and are connected to the 350 volt main power supply lead 65 through a 2,000 ohm, 20 watt resistor 123. The leads from the screen grids 305, 307 are also bypassed to ground through a 8 mfd., 600 volt condenser 124.

The plate circuit of the power amplifier extends from the anodes of the tubes 114 and 116 to the opposite ends of the 3,000 ohm primary winding 125 of an output transformer. The output transformer is of the type T-34S58 (Thordarson) and has a center tap on the primary winding 125 which extends to the 360 volt plate circuit lead 62 of the main power supply circuit. The 500 ohm secondary winding 126 of the output transformer is bridged by a 1 mfd., 400 volt condenser 127. One side of the winding 126 is grounded and the other side of the winding extends through an output lead 128 to the conductor 7E in the cable E.

The variable frequency alternating-current generating circuit for the aircraft course recorder unit is identical in all respects with the circuit just described in connection with the submarine course recorder unit, except for the input and output connections. In the case of the input, the 300 volt regulated voltage lead 91 is tapped and connected with certain variable resistances with the wind drift unit by means of the conductor 7B extending through the cable B. A return conductor 8B extends from the variable resistances in the wind drift unit through the cable B and feeds to the input lead 131. The input lead 131 is connected in identically the same manner and serves the same function as the input lead from the central contact 95 of the potentiometer 93 as described in connection with the submarine course recorder circuit. The output lead 132 from the A.-C. generating circuit for the aircraft course recorder extends from the secondary winding of the output transformer to the conductor 6D of the cable D and thence through that cable to the aircraft course recorder. Within the central unit the conductors 3F and 5F are bridged by a pilot light 133 and the conductor 3F is directly connected to the conductor 1E of cable E and 2D of cable D. The conductor 5F is grounded.

The 300 volt regulated power supply from the conductor 2F of the cable F is connected to the conductor 2E of the cable E, 5D of cable D and 4B of cable B.

The conductors 5E and 6E of cable E are connected to the center contacts 134 and 135 of a pair of 75 ohm, 25 watt cross-connected ganged potentiometers 136 and 137. One end of each of the potentiometers 136 and 137 is connected to the power input line 53 while the opposite end terminals of each of the potentiometers are joined and connected to conductor 4E of cable E through a 100 ohm, 50 watt resistor 138. Conductor 8E of cable E is grounded within the central unit.

In cable D the conductor 1D is grounded within the central unit. The conductors 3D, 8D, 9D and 10D of cable D connect to 10B, 3B, 2B, and 1B respectively. The conductor 7D is connected to the input lead of the meter-actuating circuit.

The meter-actuating circuit

The input lead 141 of the meter-actuating circuit extends from the conductor 7D of cable D to a .1 mfd., 400 volt grid condenser 142 and thence to the control grid 143 of the vacuum tube 144. The tube 144 is of the 6SN7GT type. Its filament is energized directly from the low-voltage lead Y previously described. A 500,000 ohm, ½ watt, grid leak 145 is bridged between the grid 143 and ground. The anode 146 of the tube 144 is connected to a 50,000 ohm, 1 watt resistor 147 and thence to the 300 volt regulated voltage supply lead 91. The 25,000 ohm, 25 watt dropping resistor 148 is also connected to the 300 volt regulated voltage lead 91 and has its opposite end connected to one end terminal of a 2,000 ohm wire-wound potentiometer 149. The circuit extends from the opposite end terminal of the potentiometer 149 through a 500 ohm, 1 watt resistor 150 to a ground connection. The cathode 151 of the tube 144 is connected to the slider 152 of the potentiometer 149.

The grid 154 and anode 155 of the vacuum tube 144 are joined and are coupled to the anode 146 of the same tube through a .1 mfd. condenser 156. A 100,000 ohm, ½ watt resistor 157 is bridged between the grid 154 and ground. A phone test jack 158 is provided between the anode 155 and ground.

The output from the cathode 159 of the tube 144 is fed to the input lead 161 of the circuit for the final vacuum tube amplifier. The input lead 161 extends through a 1 meg., ½ watt resistor 163 to the grounded central adjustable tap 164 of a 500 ohm potentiometer 165. The opposite end terminals of the potentiometer 165 each extend through the 500 ohm resistor 166 and 167 respectively to the cathodes of the tube 168. Each of the two cathodes is also connected to the 300 volt regulated power supply lead 91 by the 25,000 ohm, 10 watt resistors 169 and 170.

The grid 171 of the tube 168 is connected directly to the input lead 161 while the grid 172 is connected to the input lead 161 through a 500,000 ohm, ½ watt resistor 173 and a 3 meg. ohm, ½ watt resistor 174. The filament of the tube 168 is energized from the filament supply lead Y. A 1 mfd. condenser 175 is bridged between ground and a point between the resistor 173 and the resistor 174. A .1 mfd. condenser 176 is bridged across the resistor 163 between the input lead 161 and ground.

The plate circuit of the tube 168 extends from the anodes 179 and 180 through the 50,000, 1 watt resistors 177 and 178, respectively, to the 300 volt regulated voltage supply lead 91. The anodes 179 and 180 are joined by a conductor 181 extending through a pair of zero-center direct-current millimeters of a sensitivity of one milliampere for full scale deflection. However, since one of these meters 182 is at the instructor's station and the other meter 29 is positioned at the student's station, the circuit of the conductor 181 extends through the meter 182 and hence through the conductors 5B and 6B of cable B, through the wind drift unit to the student's control unit where the circuit is completed through the meter 29 as will be described in connection with the description of that circuit.

The student's control unit circuit

Figures 8, 9:
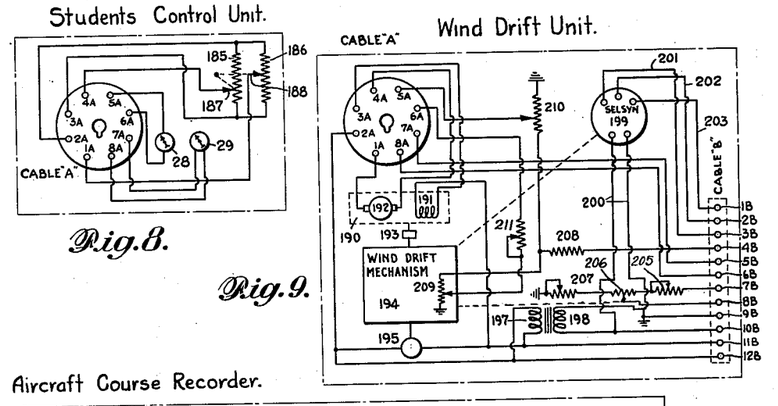
Fig. 8 is a schematic wiring diagram of the student's control unit.
Fig. 9 is a schematic wiring diagram of the wind drift unit.

This circuit, as shown in Fig. 8, consists of a meter 29 arranged to simulate the action of the indicating meter on operational submarine detection gear; a second meter 28 arranged to simulate an air speed indicator, and a pair of potentiometers 185 and 186 operated by manipulation of the control wheel. Operation of the wheel controls the speed and direction of rotation of a turn motor 190 (Fig. 9), which delivers heading information into the wind drift unit illustrated in Fig. 9. Airspeed information is delivered to the wind drift unit through a throttle mechanically connected to the wind drift unit by a flexible cable. The direct-current millimeter 29 (Fig. 8) has its two terminals connected to the conductors 7A and 8A of the cable A. The millimeter 28 has its two terminals connected to the conductors 5A and 6A in the cable A. These conductors establish connections in the instrumentalities of the wind drift unit as will be hereinafter described. A pair of 300 ohm, 50 watt potentiometers are mechanically ganged and cross-connected to the conductors 2A and 3A. The slider 187 of the potentiometer 185 is connected to the conductor 4A of the cable A while the slider 188 of the potentiometer 186 is connected to the conductor 1A of the cable A.

The wind drift circuit

The wind drift unit is supplied with 110 volts, 60 cycle alternating current through the conductors 11B and 12B of the cable B. The conductor 12B extends directly to conductor 2A of cable A and a lead from conductor 11B extends through the field winding 191 of a series type motor 190 and thence to conductor 3A and cable A. The commutator brushes on the armature 192 of the motor 190 are connected to the conductor 1A and to the conductor 4A, respectively.

It has been previously mentioned that the plate circuit from the meter-actuating circuit to the student's control unit passed through the wind drift unit. For this purpose the conductors 7A and 8A of cable A are directly connected with conductors 5B and 6B of cable B. The armature 192 of the motor 190 rotates in accordance with the relative settings of the potentiometers 185 and 186, which, as noted above are controlled from the wheel 27 to introduce aircraft heading into the wind drift unit 194 through a reduction gear box 193. It may be explained that the wind drift unit 194 is a mechanical device well-known in the art but since its exact mechanical features form no part of the present invention except as a part of the general combination it will not be described in detail in this application except to point out that aircraft heading, airspeed, wind direction and wind velocity are combined vectorially within this unit and aircraft course and ground speed are computed. Course information is available at selsyn 199 and ground speed moves the slider of a potentiometer 206 in a linear manner to vary the frequency of the aircraft drive A. C. generating circuit. A torque motor 195 associated with the wind drift unit is connected across the conductors 11B and 12B, respectively. This motor serves only to load the wind drift mechanism to reduce lost motion or backlash.

A primary winding 197 of a step-down transformer is also connected across the power leads 11B and 12B. The 32 volt secondary winding 198 of this transformer is connected directly to the two power leads 200 of the selsyn generator 199. The power leads from the secondary winding 198 of the transformer also extend through the conductor 9B and 10B of the cable B to the central control unit where the conductor 9B is grounded. The three selsyn generator control leads 201, 202, and 203 extend through the conductors 2B, 3B and 1B to the central control unit and thence through the conductors 8D, 9D and 10D of the cable D to the aircraft course recorder unit where they interconnect wtih a corresponding selsyn motor that will be described in connection with that unit.

The conductor 7B of the cable B supplies 300 volt regulated power supply to the wind drift unit. The unit includes a potentiometer 205 used to preset the maximum desired speed, the potentiometer 206 operated by ground speed, and potentiometer 207 used to preset the minimum desired speed. With changes in ground speed the potential applied to the alternating current generator circuit for the aircraft course recorder will vary in a linear fashion and hence change the frequency in an approximately linear fashion. One end of the 10,000 ohm potentiometer 205 is connected to its conductor 7B of cable B. The opposite end of the potentiometer 205 is connected to its movable slider. One end terminal of a 50,000 ohm wire-wound potentiometer 206 is connected to the potentiometer 205 and its opposite end is connected to an end tap of a third 50,000 ohm potentiometer 207, the opposite end of which is grounded. The slider of the potentiometer 207 is grounded and the slider of potentiometer 206 is directly connected with the conductor 8B of cable B.

The 30 volt regulated power supply from the auxiliary power supply unit is supplied to the wind drift unit through the conductor 4B of cable B. This conductor is directly connected to a 25,000 ohm, 10 watt resistor 208. The opposite end of the resistor 208 is connected to the end tap of a pair of 500 ohm, 50 watt potentiometers 209 and 210, and the opposite end tap of each of the potentiometers 209 and 210 are grounded. The slider of the potentiometer 209 is connected to the terminal of conductor 6A through a 10,000 ohm potentiometer 211 and the center tap of the potentiometer 210 is connected directly to the conductor 5A of cable A. The purpose of this circuit is to vary the current through meter 28 by moving the slider of potentiometer 209 and hence to transmit airspeed data within the wind drift unit to the airspeed indicating meter 28. Potentiometer 210 presets the minimum speed calibration and potentiometer 211 presets the maximum speed calibration.

*The submarine course recorder circuit*

Figure 11:
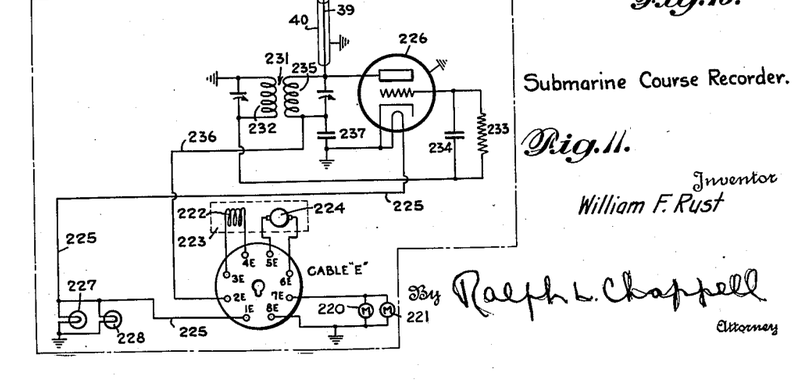
Fig. 11 is a schematic wiring diagram of the submarine course recorder unit.

The circuits carried by the submarine recorder 22 include, in general, a circuit for a pair of synchronous driving motors, a circuit for a directional control motor, and an electronic oscillator circuit for generating a modulated radio frequency wave.

Connections between all of these circuits and the remainder of the electrical apparatus is established through the flexible cable E. As shown in Fig. 11, a pair of synchronous driving motors 220 and 221 are connected directly between the conductor 7E and the grounded conductor 8E. The field winding 222 of a course directing motor 223 is connected across the conductors 4E and 3E while the armature 224 of the course motor 223 is connected directly across the conductors 5E and 6E. A tube 226 of the oscillator circuit associated with the course recorder is provided with filament voltage through a low voltage lead 225 extending from the conductor 1E to filament of the oscillator tube 226. The tube 226 is of the 6J5 type with its metal shell grounded. One side of the filament and the cathode of the tube 226 are grounded and a pair of small lights 227 and 228 are connected between the lead 225 and ground. One light projects a position indicating spot and the other is used to illuminate the inked track of the recorder. The oscillator circuit associated with the oscillator tube 226 consists of a 250 kilocycle tuned radio-frequency transformer 231 including a grid tuned circuit 232 connected to the grid of the tube 226 through a 2 meg., ½ watt resistor 233 bridged by a .0001 mfd. condenser 234. The anode of the tube 226 is connected directly to a vertical antenna 39, which is surrounded by the grounded shield 40. The anode is also connected to the plate circuit winding 235 of the radio-frequency transformer 231. The opposite side of the plate circuit winding 235 is supplied with plate voltage from the 300 volt regulated line of the auxiliary power supply unit through the lead 236 extending from the conductor 2E in cable E. One end of the tank circuit 235 is bypassed to ground through a .05 mfd. condenser 237.

*The aircraft course recorder circuit*

Figure 10:
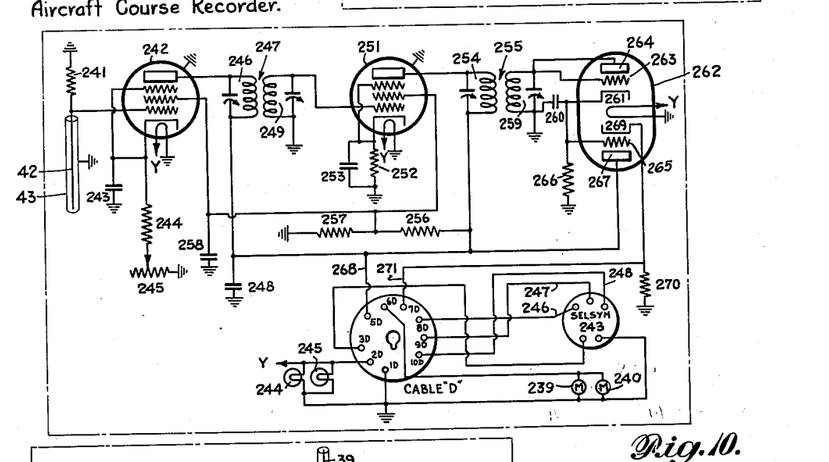
Fig. 10 is a schematic wiring diagram of the aircraft course recorder unit.

The circuit associated with the aircraft course recorder 21 includes three separate circuits; that is, a circuit for the synchronous driving motors, a circuit for a selsyn motor by which the course of the recorder is controlled, and a signal amplifying circuit whereby the signals generated in the submarine course recorder unit are picked up, amplified, demodulated and the modulation signal fed to circuit previously described.

Electrical connections between the aircraft course recorder unit and the remainder of the apparatus are established through the cable D extending from the course recorder to the central control unit. The electrical circuit to a pair of synchronous driving motors 239 and 240 is established by connecting each of these motors directly across and between the conductors 1D and 6D of cable D. The conductor 1D is also grounded to the frame of the course recorder unit and connected to one of the power terminals of a selsyn motor 243. The other power terminal of the selsyn motor 243 is directly connected to the conductor 3D of cable D. A low voltage filament supply current is supplied to the unit through the conductor 2D, and a pair of incandescent lamps 244 and 245 are bridged between the conductor 2D and ground. Similarly, the filaments of the several vacuum tubes carried by the course recorder are supplied with filament current by grounding one side of each filament and by connecting the opposite side of each of the filaments to the filament supply lead Y. The three control leads from the selsyn motor 243 are connected to the conductors 8D, 9D and 19D by the leads 246, 247 and 248, respectively.

The signal amplifying circuit carried by the aircraft course recorder 21 includes, in general, the shielded antenna heretofore described and two radio frequency amplifier tubes and a detector coupled by 250 kc. tuned transformers. The antenna 42 is surrounded by a grounded shield 43 and the antenna is grounded through a 50,000 ohm, ½ watt resistor 241. The antenna 42 is also directly connected to the control grid of the first amplifier tube 242. This amplifier tube is of the 6SJ7 type. The cathode of the tube and the supressor grid are connected directly together and are bypassed to ground through a .05 mfd. condenser 243. The cathode and suppressor grid are also connected to ground through a 200 ohm, ½ watt resistor 244 connected in series with a 2,000 ohm variable resistor 245 used as a gain control. The anode of the tube 242 is connected to one side of a tuned circuit 246 of a 250 kc. intermediate frequency transformer 247 and the opposite side of the circuit 246 is bypassed to ground through a .05 mfd. condenser 248.

The secondary circuit 249 of the intermediate frequency transformer is grounded on one side and has the opposite side connected to the control grid of the tube 251. The tube 251 is also of the 6SJ7 type. The cathode of the tube 251 and the suppressor grid are joined and are connected to ground through a 2,000 ohm, 1 watt resistor 252 paralleled by a .05 mfd. condenser 253. The anode of the tube 251 is connected to the primary circuit 254 of an intermediate-frequency transformer 255 and the opposite side of the circuit is connected to the ungrounded side of the condenser 248. The primary winding of the intermediate frequency transformer 254 is also grounded through a 30,000 ohm, 1 watt resistor 256 in series with a 30,000 ohm, 1 watt resistor 257. The screen grids of both tubes 242 and 251 are joined and are connected at a point between the resistors 256 and 257. They are also grounded through the .05 mfd. condenser 258. The secondary circuit 259 of the second intermediate frequency transformer 255 has one side grounded and connected to the cathode 261 of the tube 262, through a .0005 mfd. condenser 260. The opposite side of the circuit 259 is connected to the grid 263 and the anode 264 of the tube. The cathode 261 of the tube 262 is directly connected to the grid 265 and these are grounded through a 1 meg. ½ watt resistor 266. The anode 267 is directly connected to the plus terminal of the 300 volts (regulated) supply by connection to the tap 5D of the cable D and tap 2F of cable F. The cathode 269 of the tube 262 is grounded through a 50,000 ohm, 1 watt resistor 270 and the power output from this "cathode follower" is delivered to the meter-actuating circuit heretofore described through the lead 271 which extends from the cathode 269 to the conductor 7D of the cable D.

From the foregoing description of the structure of the device and the detailed description of all its electrical circuits by which the mechanical devices are actuated, it is believed that the general mode of operation of the device will be readily understood by those skilled in the art. However, for purposes of full clarity, it is believed advisable to briefly describe the general mode of operation of the mechanical units and to point out certain novel features in the operation of the circuits.

The novelty of the variable frequency oscillating circuits resides in the fact that they generate an alternating current in which the voltage rises as the frequency increases and the frequency rises nearly linearly with the variation of a D. C. potential. By this combination, standard 115 volt 60 cycle synchronous motors may be driven throughout a very wide range of speeds with satisfactory operation at all points throughout the range. As a matter of fact, it has heretofore been pointed out that a range as great as 5 to 1 is satisfactorily achieved. The meter-operating circuit also accomplishes results not heretofore known, in that it gives a D. C. output of one polarity in response to a signal of diminishing strength, and of opposite polarity in response to a signal of increasing strength.

*Operation of the power supply circuits*

The apparatus includes a main power supply unit and an auxiliary power supply unit. In the main power supply unit the low voltage secondary winding 59 supplies filament current to the full wave rectifier tube 58 and this tube connected to the center-tapped high voltage secondary winding 57 of the transformer acts as a full wave rectifier to supply a 360 volt positive potential to the lead 62. This lead 62 provides a plate potential for the power amplifiers of the alternating current generating circuits for both the submarine course recorder and the aircraft course recorder. The high voltage power supply from the tube 58 is also filtered by the choke coil 63, the condensers 64 and 66, to provide a 350 volt positive potential supply to the lead 65. The lead 65 delivers plate potential to the first amplifier tubes for each of the alternating current generating circuits and screen potential to the power amplifier tubes. Filament current is supplied to all of the tubes in both alternating current generating circuits by the secondary winding 56 of the main power supply unit.

The auxiliary supply unit includes a low voltage winding 73 to provide filament current to the full wave rectifier tube 75 and this tube, connected to the high voltage secondary winding 72 of the transformer, delivers high voltage direct current to the output of the filter comprising the condensers 78 and 79 and the choke coil 77. This voltage is fed through resistor 80 to tubes 87 and line 81. This line supplies regulated 300 volts of plate potential to the submarine course recorder, the aircraft course recorder, the wind drift unit and airspeed indicator bridge circuit.

The output of the filter also feeds through the resistor 85 to the line 82 and the gaseous tubes 86, which act as voltage regulators to provide a 300 volt positive potential regulated voltage supply for the signal amplifier circuit, meter-actuating circuit and the oscillators of both the alternating current generating circuits. The low voltage winding 74 of the auxiliary power supply unit provides filament current for the submarine course recorder and the aircraft course recorder and in addition provides low voltage filament current for the incandescent lamps carried by each of these recorders as well as filament current for the signal amplifier and meter-actuating tubes.

*Operation of the alternating current generating circuits*

The 300 volt regulated voltage power supply is impressed on a voltage divider comprising the resistances 92, 93 and 94. The slider 95 on the potentiometer 93 acts as an input lead for the alternating current generating circuit associated with the submarine course recorder. As current flows through the resistor 96 the condenser 98 becomes charged until the potential on the anode of the gas tube 97 reaches the ionization voltage of the tube, at which time the tube will fire discharging condenser 98 and the potential on the anode and on the lead 101 will fall to the voltage at which the tube ceases to ionize. This action, repeated at a rate between the rate of 30 and 150 cycles per second, generates a wave of sawtooth shape, the frequency of which is controllable by the adjustment of the slider 95 of the potentiometer 93 to vary the applied potential. The resistor 102 acts to discriminate against the high frequency components of the wave and the condenser 103 acts as a blocking condenser to prevent the D. C. potential of the line 101 from reaching the grid 106 of the amplifier tube 107. The degree of amplifier gain may be adjusted by presetting the slider 105 of the grid 106 to obtain optimum performance. The plate circuit from the anode 109 of the tube 107 is completed through the resistor 111. The signal output from the plate 109 is coupled to the control grid of the power amplifier tube 114 by the blocking condenser 115. The signal is also impressed on a voltage divider consisting of resistors 119 and 120 feeding a portion of the signal voltage to grid 118 of the tube 107. The grid 118 controls the signal output from the anode 110, the circuit of the tube being completed through the resistor 112. The output signal from the anode 110 is impressed on the control grid of the other push-pull amplifier tube 116 through the blocking condenser 117.

Since the potential on the grid 118 is taken from the anode 109, the oscillations introduced on the control grids of the push-pull power amplifier tubes 114 and 116 will be 180 degrees out of phase with each other. Thus, when the signal is introduced through the first tube 107, the circuit coupling the tube 107 to the tubes 114 and 116 will act as a phase inverter so that the output from push-pull amplifier tubes will induce an alternating current in the secondary winding 126 of the output transformer.

It should be noted, however, that while the circuit is designed for an alternating current frequency range of between 30 cycles per second and 150 cycles per second the condensers 115 and 117 are of compartively small capacity and the resistors 119 and 120 are of relatively low value. The particular combination of resistor and condenser values used results in a circuit having a short time constant which attenuates a high frequency less than a low frequency. Similarly, the winding 126 of the output transformer is mismatched to the recorder drive motors (which constitutes an inductive lead) at the lower frequencies at which the circuit operates, in such a manner that the circuit approaches a condition of impedance matching only as the maximum operating frequency of the circuit is reached. In addition, the output circuit is tuned to resonance at the maximum frequencies to cause a rise in applied voltage as the frequency is increased. The combination of condensers, resistors and inductances of the values indicated, comprise means whereby the output voltage of the circuit will be increased in response to increase in frequency of the input.

With the values indicated, the output will be approximately 60 volts at a frequency of 30 cycles and the voltage and frequency will rise in a generally linear fashion to a maximum operating voltage of 200 volts at 150 cycles.

The alternating current generated in the winding 126 of the output transformer, is fed directly to the parallel synchronous driving motor 220 and 221 on the submarine course recorder unit. Since these motors constitute a highly inductive load, the increase of voltage in response to the increase in frequency of the driver amplifier provides a means for maintaining a relatively constant current through the load and thus causing the motors to operate throughout a wide range of frequencies without excessive loss of power and without undue temperature rise.

The operation of the alternating current power generating circuit for the aircraft course recorder motors is identical in all respects with the circuit just described. However, the frequency of the circuit is mechanically controlled rather than manually controlled as in the case of the submarine course recorder. For this purpose, the 300 volt regulated voltage supply line 91 is tapped into the conductor 7B of the cable B and is applied across a voltage divider consisting of the potentiometers 205, 206 and 207 (Fig. 9). The potentiometers 205 and 207 are preset to establish the desired maximum and minimum frequencies respectively. Potentiometer 206 is mechanically controlled by instrumentalities contained in the wind drift unit 194, so that the factors of air speed and heading together with wind velocity and direction are resolved into true ground speed which varies the setting of potentiometer 206 in a linear manner, thereby varying the frequency drive.

The output of the circuit is coupled directly to the synchronous motors 239 and 240 (Fig. 10) through the lead 132 extending to the conductor 6D of the cable D and thence to the ungrounded side of the selsyn motors.

The rate of turn of the submarine course recorder unit 22 is controlled by manual manipulation of the ganged potentiometers 136 and 137 (Fig. 6). These are at the instructor's station. The turn rate motor 223 (Fig. 11) of the submarine course recorder unit is operated on 115 volts, 60 cycles alternating current. It circuit extends from the cable C (Fig. 6) through the lead 54, through the cable 3E, through the field winding 222 (Fig. 11) of the motor, back through the conductor 4E of the cable, through the dropping resistor 138 (Fig. 6), thence in a parallel circuit through the two potentiometers 136 and 137, and back through the alternating current supply line 53. Current through the motor armature 224 is supplied by connecting the armature brushes to the sliders 134 and 135 of the cross connected ganged-potentiometers 136 and 137 through the conductors 5E and 6E of cable E. The center contact of the potentiometers 136 and 137 are mechanically coupled so that they move simultaneously but move in opposite directions along the resistances. Thus, when the contactors are both in center positions, no current flows through the armature and the motor will be stationary. If the potentiometers are rotated, the contactors will move in opposite directions along the resistance. As they move in one direction, the motor will rotate in the opposite direction because of the reversal of phase between the armature and field windings.

The aircraft course recorder unit is controlled in a similar way by the two potentiometers 185 and 186 in the students control unit. These control the motor 190 in the wind drift unit. However, since the true ground course of the aircraft course recorder is dependent not only on the heading as set up in the student's control, but also on the direction and velocity of wind, the course of the recorder is not directly controlled by the motor 190 but is modified to include the effect of wind course and wind direction. For this purpose, the motor 190 is coupled into the wind drift unit 194 through the reduction gearing 193 and the wind drift mechanism in turn mechanically actuates the selsyn motor 199 to set up the true aircraft course on the selsyn. The selsyn generator 199 is connected to the selsyn motor 243 by the leads 201, 202 and 203, which extends through the conductors 3B, 2B and IB respectively, of cable B, through the conductors 8D, 9D and 10D respectively of cable D, and thence through the leads 246, 247 and 248 to the selsyn motor 243. The pair of low voltage power leads from the transformer 198 and selsyn 199 also are connected to the selsyn 243. Thus the selsyn motor 243 directly controls the course of the aircraft course recorder unit 21.

Signal generator circuit operation

The submarine course recorder unit 22 carries means for generating an electromagnetic signal so that the signal may be picked up by the aircraft course recorder when the two recorders come into close proximity with each other in their relatively movement about the field. In the apparatus chosen as best illustrative of the principles of this invention, the signal generating unit includes the vacuum tube 226 and the low frequency transformer 231 coupled together to generate a 250 kilocycle electromagnetic wave which is transmitted from the antenna 39. It is desirable that this wave be modulated with an audiofrequency, however, and for this purpose the grid condenser 234 and grid leak 233 are so selected that the tube 226 acts as a blocking grid oscillator and impresses an audiofrequency sawtooth wave (in this case, about 1000 cycles) on the 250 kc. carrier wave. The modulated radio frequency signal is radiated from the antenna 39, but since the antenna 39 is shielded with a grounded shield 40, the signal will be detected in the detector apparatus carried by the aircraft course recorder unit 21 only when the antenna 39 which lies immediately below the glass plate 14 comes into very close proximity to the antenna 42 carried by the receiving apparatus (see Figure 5).

Signal receiving circuit operation

The signal receiving circuit associated with the aircraft course recorder 21 consists of radio frequency amplifiers, a diode detector, and a cathode follower to act as an impedance matching device and thereby to supply an output signal suited to transmission to the meter-actuating circuit through the cable D.

The antenna 42 of the receiving circuit picks up the signal, and applies it to the grid of the first radio frequency tube 242. The shield 43 limits the range of the receiver so that the field of reception is limited to the area immediately surrounding the transmitting antenna 39. The output signal from the first radio frequency amplifier tube 242 is fed to the tube 262 through the transformer 255. One grid 263 and anode 264 of the tube 262 are joined together so that they cooperate with the cathode 261 to function as a diode detector, the audiofrequency output of which is impressed on the grid 265 of the same tube. The tube elements 266, 267 and 269 act as a cathode follower and impress the output signal on the lead 271 from which it is fed to the conductor 7D of the cable D and thence transmitted to the meter-actuating circuit.

Operation of the meter-actuating circuit

The portions of the signal receiving circuit physically associated with the central control unit and mounted in the control unit 17 include a meter-actuating circuit comprising an audio frequency amplifier and a balanced output circuit consisting of two substantially identical thermionic amplifying circuits together with a time delay means whereby the response of one of said balanced circuits lags behind the response of the other, for purposes that will appear.

The sawtooth audio frequency input from the conductor 7D of the cable D is impressed on the grid 143 of the first amplifier tube through the blocking condenser 142. The plate circuit of the tube 144 is completed through the resistor 147 extending to the 300 volt supply lead 91. The audio output signal from the anode 146 is impressed on the grid 154 of the tube 144 through the blocking condenser 156 and the rectified D. C. output from the cathode 159 is coupled directly to the next amplifier tube through the lead 161. In order to supply proper bias on the grid 143 of the tubes 146, the resistors 148, 149 and 150 are connected in series between the ground and the high voltage lead 91 and the tap 152 of the potentiometer 149 is directly connected to the cathode 151. The contact 152 is preferably adjusted so that the first stage of amplification of the tube operates at somewhat above the cut-off point of the tube, so that the tube acts as a clipper amplifier and responds only to signals of predetermined high intensity. The range of signal pickup is adjusted by this control.

The circuits associated with the output amplifier tube 168 comprise, in essence, two similar and parallel circuits together with means for determining whether input signals impressed simultaneously on each of the circuits are of increasing, decreasing or constant amplitude. The tube itself includes a single filament together with a pair of separate cathodes, a pair of separate grids, and a pair of separate anodes. The plate current supply to the tube is established by connecting each anode to the 300 volt supply lead 91 through the dropping resistors 177 and 178 respectively. The twin cathodes of the tube are biased by connecting them to voltage dividers composed of resistors 165, 166 and 169 and resistors 165, 167 and 170. The tube bias and plate currents are balanced against each other by adjusting the grounded slider 164 of the potentiometer 165.

In operation, the rectified D. C. output from the tube 144 is fed into the circuit through the lead 161 to lead resistor 163 and will be filtered by condenser 176. The input signal from the lead 161 is impressed directly upon the grid 171, and through a filter composed of resistor 174 and capacitor 175 and through resistor 173 to the grid 172. Resistor 173 has no appreciable effect on the circuit operation unless the grid 172 should be driven positive with respect to its cathode in which case resistor 173 limits the discharge rate of condenser 175.

When a signal of constant amplitude is being impressed on the circuit, the grids 171 and 172 are at equal potential with result that the potential of the anodes 179 and 180 are equal since the anode currents are equal. Since the potentials of the plates 179 and 180 are equal there is no tendency for current to flow through the meter circuit 181 and the milliammeters 182 and 29 register zero. However, when a signal of increasing amplitude increases the positive potential of the lead 161, the potential of the grid 171 will be instantly increased, while the potential of the grid 172 will increase more slowly, due to the time required to charge condenser 175 to the new potential through resistor 174. Under these circumstances, the potential of the grid 171 will always lead that of the grid 172, in a positive sense with the result that because of increased anode current the potential of the anode 179 will be less than the potential of the anode 180. Under these circumstances, current will flow from the anode 180 through the meter lead 181 to the anode 179. The flow of current in the lead 181 will be indicated by the meters 182 and 29. When a signal of decreasing amplitude decreases the positive potential of lead 161, the potential of the grid 171 will drop instantly while the potential of the grid 172 drops more slowly. Now, the grid 171 will again lead the grid 172 in a negative sense with the result that the potential on the anode 179 will be greater than the potential on the anode 180, so current will flow in opposite directions through the meter 182. The above-described circuit characteristics permit the observer of a zero center meter to immediately ascertain whether the signal level is increasing, decreasing or remaining constant, with the meter deflection approximately proportional to the rate of change and the current direction indicative of whether the signal level is increasing or decreasing.

*Training procedure*

The student is seated at the student's station 25 and the instructor takes his position in front of the drawer 16 where he can manually manipulate the wind drift unit controls 18 and the controls of the central unit 17. The operator energizes all circuits by closing the switch 51, whereupon the recorders 21 and 22 both begin their motion and the optical projectors associated with each recorder throw images in the translucent plates 11 and 14; that is, the aircraft course recorder 21 projects its image consisting of a silhouette of the aircraft on to the plate 11 while the submarine course recorder 22 projects a spot of light onto the translucent plate 14. By observation of the plate 11 at the image projected thereon, the student can determine the relative location and heading of the aircraft course recorder, but he has no means of determining at what point on the field the submarine course recorder 22 is positioned. This situation simulates the situation of a pilot patrolling on an anti-submarine mission wherein he knows his own location and knows the approximate area he is expected to search, but has no exact knowledge as to where an enemy submarine is located within that area. The student is therefore faced with the same problem that confronts the pilot of a patrol craft; that is, he must maneuver the aircraft in such a manner as to cover the maximum possible area of the field 11, until he picks up on the instrument 29 a signal indicating that the aircraft course recorder has passed closely over the submarine course recorder. To accomplish this, the student may fly the course recorder in any direction he deems most advisable, and may describe certain recognized patterns of flight whereby the greatest amount of territory is covered with sufficiently close coverage to give the best results; that is, coverage whereby the difference between the various convolutions of the flight pattern are small enough so that there is little danger of missing the signal generated by the submarine.

Various problems of anti-submarine search tactics may be set up by the instructor as the training of the student permits; that is, the more simple problems are presented to beginning students, and the more complex problems reached as the level of training of the student rises. Ordinarily, it is assumed that the crew of the patrol aircraft either sights a submarine on the surface or is advised that one has been sighted and given radio bearings by which to reach the point at which the submarine was observed. In either case, the instructor orally informs the student of the point on the area represented by the plate 11 at which the submarine was last sighted and submerged. The student will then direct his course; that is, the course of the aircraft course recorder 21, to the vicinity in which the sub was sighted by means of the control wheel 27 which operates through the potentiometers 185 and 188 (Fig. 8) to alter the direction of movement of the course recorder. It will be realized, however, that in actual movement the time interval between the time that the sighted sub submerged and the time that the patrol aircraft arrives on the scene is sufficient for the submarine to have moved a considerable distance underwater so that it is doubtful that the aircraft will immediately pick up its signal. A similar result is accomplished in the trainer since the movement of the submarine course recorder 22, while considerably slower than the movement of the aircraft course recorder 21, is nevertheless sufficient to move the transmitting antenna 39 sufficiently so that its signal will not be picked up by the receiving antenna.

In order to locate the submarine, it is then necessary for the student or pilot to fly in a pattern to search the most likely territory immediately surrounding the point at which the submarine was last sighted. This function can be simulated accurately by the trainer since the speed of the aircraft course recorder 21 is the scale speed of an aircraft while the speed of the submarine course recorder 22 is the scale submarine speed with the result that the student may operate the controls to fly in ever-widening patterns in an effort to pick up the signal from the submarine before it gets out of range. In operational patrols, the problem presented is seldom so simple that it may be solved by simply flying in ever-widening circles but several specific and well defined search patterns have been devised whereby the aircraft pilots can maneuver their craft in such a manner as to cover a relatively large amount of territory and provide a minimum chance of escape for the underwater target. These patterns vary in accordance with the circumstances; that is, the same pattern will not be necessarily used for attempting to intercept a target that has been unobserved for a greater time and which thus may be at a greater distance from the reference point. However, since the student will have knowledge of the time interval since the target location was known, he will be able to choose a pattern and will base his judgment on the same factors that would influence his judgment in flying in actual operation. Having decided on a flight pattern, the student will attempt to follow the pattern accurately by means of skillful manipulation of the wheel 27. He will also be able to observe the accuracy of the pattern flown by observing the movement of the image projected from his course recorder. As these functions are performed, it is also incumbent on the student to observe the needle of the meter 29 so that in case the target is located it will be instantly detected. When the target is located and its location or presence is indicated by the meter 29 (the student ordinarily marks its position with a china crayon on the glass table top for reference simulating the release of a smoke bomb or dye slick), the student is again faced with the problem of maintaining instrument contact with the target; that is, since the speed of the course recorder 21 is greater than that of the submarine, the course recorder 21 will be carried beyond the range of the signal equipment and the signal will be lost before the aircraft can be swung about. In addition, the submarine course recorder 22 is moving and its direction of movement is unknown to the student with the result that the student must adopt a flight pattern well suited to maintaining substantially constant contact with the target in the immediate vicinity and attempt to pick up repeated signals on the meter 29 so that the course of the submarine recorder may be traced and contact with it will not be lost for over a minimum interval of time. As the skill of the student increases, the instructor may present additional problems of more complicated nature, the complications arising from requiring the student to compensate for certain other variables encountered under certain conditions of flight; as an example, it may be pointed out that since the adjustment of the potentiometers under the control of the wheel 27 established a given turn rate, the recorder will swing in a true arc of a circle and it will be a comparatively simple task for the pilot to fly any geometric pattern that he has chosen. However, in an actual aircraft, the accurate flying of any specified geometric pattern may be complicated by the presence of a strong wind which has a tendency to blow the aircraft off its course, to distort the shape of its turns, and to affect its speed in accordance with whether the craft is traveling with or against the direction of the wind.

These complications arising in actual flight may also be simulated in the trainer by the wind drift mechanism; that is, the instructor may manually set the dials of the wind drift unit 18 to a specified wind direction and wind velocity, and this mechanism will, by mechanical means not forming a part of this invention, influence the adjustment of the turning rate set up by the wheel 27 in the manner as to distort the turns and influence the speed of the recorder 21 in the same manner that the given wind direction and velocity affects an operational aircraft. Thus, the student must learn to compensate for these factors and develop sufficient skill so that he can follow a fixed geometric pattern in spite of the disturbing influences caused by the wind.

Another complication that is encountered in maneuvers and which may be accurately simulated in the present trainer is caused by false signals. Such false signals may be introduced into the meter 29 by the instructor by manipulating the potentiometer 164 in the meter-actuating circuit (Fig. 6) to unbalance momentarily the circuits and cause a current flow in the output lead 181. Obviously, the manner in which the potentiometer 164 is manipulated will result in an arbitrary signal.

The instructor may add further complications to the course of training of the student by manipulating the potentiometers 136 and 137 (Fig. 6), to alter the course or heading of the submarine course recorder and by manipulating the potentiometer 93 to alter its speed so that the student will have no other information than that the speed of the submarine is limited and that its rate of turn is also marked by certain definite limitations. It may again be pointed out that the maximum and minimum speeds of the course recorders are exactly proportional to the ranges of operating speeds of a submerged submarine and aircraft. Similarly, since neither an aircraft or a submarine can execute a right angle turn, the turning rate of each is established by proper circuit constants so that the time interval required and the distance traveled by either in executing a given maneuver will be exactly what would be required in the actual craft; that is, the limitation of speed and of maneuverability of each recorder is in exact proportion to the limitations of the aircraft and submarines themselves.

Many types of problems and many complications encountered in the actual control of an aircraft and its anti-submarine detection gear on operational mission can be accurately simulated so that pilots can be readily trained in the use of the equipment. It is to be particularly noted that while in actual flight targets are encountered rather rarely, with a result that the student will become familiar with certain typical characteristics of the needle swing of the meter 29 that are often generated by encountering a target, and will also become familiar with various false signals and thus become better able to distinguish the true from the false.

The electric circuit arrangements of the invention described hereinabove and including the main power supply circuits, the auxiliary power supply circuits, the apparatus for generating the variable frequency currents, the meter-actuating circuits, the student's control unit, the wind drift unit, the submarine course recorder unit, and the aircraft course recorder unit are disclosed and claimed in my copending application entitled "Apparatus for Training Aircraft Pilots," Serial Number 171,485, filed June 30, 1950.

While I have shown and described what is, at present, believed to be a preferred embodiment of the invention, I am aware that it is subject to numerous modifications and changes of design and arrangement without departing from the inventive thought, and I therefore wish to be limited only by the scope of the appended claims.

The invention described herein may be manufactured and used by or for the Government of the United States of America for governmental purposes without the payment of any royalties thereon or therefor.

I claim:

1. In a course recording device for indicating the relative positions of two or more moveable objects, a target position recorder, a search recorder, spaced supporting surfaces, said recorders being adapted to be propelled over said surfaces at predetermined velocities, indicating means, and electro-magnetic energy transmitting and receiving apparatus respectively carried by said target and search recorders and operable to energize said indicating means to indicate the immediate proximity of the search recorder to the target position recorder.

2. In a course recording device for indicating the relative positions of two or more moveable objects, a target position recorder, a search course recorder, spaced supporting surfaces, said recorders being adapted to be propelled over said surfaces at predetermined velocities, and transmitting and receiving means on said target and search recorders, respectively, to establish substantially point-to-point radiant-energy communication between said recorders.

3. In a training device, in combination, a student's station, an instructor's station and a pair of spaced parallel plates defining an area representing a field of movement; a pair of course recorders movable over respective plates; instrumentalities located at the instructor's station for controlling one of said course recorders; instrumentalities at the student's station for controlling the other of said course recorders, electrical circuit means controlled by the movement of one of said recorders for providing an amplitude-variable signal, and instrumentalities at the student's station responsive to said signal to indicate the approach of the pair of recorders to positions one above the other within said field of movement.

4. In a course recording device, in combination, a target position recorder for indicating the position of a first moveable object, a search course recorder for indicating the position and course of a second moveable object, a pair of spaced parallel plates defining surfaces on which respective ones of said recorders are movable, the positions of both of said recorders with respect to the area of their movement and with relationship to each other being simultaneously observable, one said plate being disposed to define a movement surface for one said recorder and a screen for the formation of a visual indication of the position of the other said recorder, and at least one optical light projector on one of said recorders to throw a position indicating image on said one surface.

5. A combination as defined in claim 4 wherein said target and search recorders respectively carry radiant-energy transmitting and receiving apparatus, said combination further comprising indicating means observable by a student, and means responsive to the reception of radiant-energy by the receiving apparatus on the target recorder for actuating said indicating means, to indicate the occurrence of a superposed positional relationship between said search and target recorder.

6. In a training device, in combination, a student's station, an instructor's station and an area representing a field of movement; a pair of course recorders dirigibly movable over respective plate members, said members being in vertically spaced arrangement; instrumentalities located at the instructor's station for controlling the movement of one of said course recorders to simulate the movement of a target, instrumentalities at the student's station for controlling the movement of the other of said course recorders to represent the movement of an aircraft in search of said target; optical projectors to project a beam of light from each of said course recorders to indicate the relative position thereof, at least one of said beams of light being projected on a surface within view of the aforementioned student's station, and both of said beams of light being visible from the aforementioned instructor's station.

7. In a training device including an instructor's station and a student's station, a plane surface; a target position recorder moveable over said plane surface in any direction at a variable rate of speed; electric means under the control of instrumentalities at the instructor's station for altering the course of movement for said target position recorder and varying the rate of progress of said recorder; a second plane surface corresponding to and superposed above the first mentioned plane surface; a search path recorder moveable in any direction about said second plane surface and controllable throughout a variable range of speed; electric means under control of instrumentalities at the student's station for altering the course of movement of said search path recorder and for varying its speed; a third plane surface comprising a light transmitting plate above the search path recorder, together with a light projector on said search path recorder to project a course and heading indicating image on the light transmitting plate, indicating means at said student's station and adapted to indicate a condition of proximity of said search recorder and said target recorder, a radiant-energy generator carried by said target recorder and including means for projecting a directive beam of energy toward said second plane surface, a radiant-energy receiver carried by said search recorder and including means for receiving energy from said directive beam when said search recorder is disposed substantially above said target recorder, and means responsive to said received energy for actuating said indicating means.

8. In combination, a target-position recorder, a search-course recorder, spaced supporting surfaces, said recorders being adapted to be propelled over said surfaces at predetermined velocities, and, means including a radiant energy transmitter on one of said recorders and a receiver on the other of said recorders to establish substantially point-to-point radiant-energy communication between said recorders, means for controlling one of said course recorders and positioned to be available to be operated by an instructor, and means adapted for controlling the other of said course recorders and positioned to be available to be operated by a student.

WILLIAM F. RUST.

REFERENCES CITED

The following references are of record in the file of this patent:

UNITED STATES PATENTS

| Number | Name | Date |
| --- | --- | --- |
| 1,419,874 | MacMillan | June 13, 1923 |
| 1,896,238 | Hund | Feb. 7, 1933 |
| 2,179,663 | Link | Nov. 14, 1939 |
| 2,191,730 | Sjostrand | Feb. 27, 1940 |
| 2,243,408 | Anderson | May 27, 1941 |
| 2,252,083 | Luck | Aug. 12, 1941 |
| 2,298,305 | Muller | Oct. 13, 1942 |
| 2,321,799 | Cone | June 15, 1943 |
| 2,329,612 | Hill | Sept. 14, 1943 |
| 2,330,638 | Stratton | Sept. 28, 1943 |
| 2,332,475 | Sorensen | Oct. 19, 1943 |
| 2,332,523 | Norden | Oct. 26, 1943 |
| 2,361,177 | Chilowsky | Oct. 24, 1944 |
| 2,369,678 | McWhirter | Feb. 20, 1945 |
| 2,389,359 | Grow | Nov. 20, 1945 |
| 2,396,857 | Kittredge | Mar. 19, 1946 |
| 2,405,591 | Mason | Aug. 13, 1946 |
| 2,406,574 | Waller et al. | Aug. 27, 1946 |